United States Patent
Tsukamoto et al.

(10) Patent No.: US 10,672,400 B2
(45) Date of Patent: Jun. 2, 2020

(54) STANDBY MODE IN ELECTRONIC DEVICE, INFORMATION PROCESSING SYSTEM, INFORMATION PROCESSING METHOD, AND PROGRAM

(71) Applicant: LENOVO (SINGAPORE) PTE. LTD., Singapore (SG)

(72) Inventors: Yasumichi Tsukamoto, Yokohama (JP); Seiji Yamasaki, Yokohama (JP); Munefumi Nakata, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 126 days.

(21) Appl. No.: 16/043,154

(22) Filed: Jul. 24, 2018

(65) Prior Publication Data

US 2019/0348046 A1 Nov. 14, 2019

(30) Foreign Application Priority Data

May 10, 2018 (JP) ................ 2018-091695

(51) Int. Cl.

| G10L 15/26 | (2006.01) |
| G10L 15/22 | (2006.01) |
| G06K 9/00 | (2006.01) |
| G06F 3/16 | (2006.01) |

(52) U.S. Cl.
CPC ............ *G10L 15/265* (2013.01); *G06F 3/167* (2013.01); *G06K 9/00006* (2013.01); *G10L 15/22* (2013.01)

(58) Field of Classification Search
CPC .................................................. G10L 15/265
See application file for complete search history.

(56) References Cited

U.S. PATENT DOCUMENTS

| 6,804,653 B2* | 10/2004 | Gabel | G10L 15/26 |
| | | | 704/231 |
| 2002/0151283 A1* | 10/2002 | Pallakoff | G06F 3/14 |
| | | | 455/575.1 |
| 2009/0160681 A1* | 6/2009 | Chen | G06F 3/021 |
| | | | 341/23 |
| 2009/0313014 A1* | 12/2009 | Shin | G10L 15/22 |
| | | | 704/235 |
| 2013/0080171 A1* | 3/2013 | Mozer | G10L 15/22 |
| | | | 704/251 |

(Continued)

FOREIGN PATENT DOCUMENTS

| JP | 2011258095 A | 12/2011 |
| JP | 2012203813 A | 10/2012 |

(Continued)

*Primary Examiner* — Shaun Roberts
(74) *Attorney, Agent, or Firm* — Shimokaji IP

(57) ABSTRACT

An electronic device is attachable to and detachable from an information processing device having a mode control portion performing control for switching an operation state in which background processing is executed in a standby mode in which the display of a display portion is stopped and a low power consumption state in which the information processing device can be quickly returned to the operation state and has a light emission portion disposed so as to be visibly recognized in a state in which the display of the display portion is stopped and a lighting control portion lighting the light emission portion in the standby mode when a predetermined event to be notified to a user occurs in the background processing.

11 Claims, 12 Drawing Sheets

(56) References Cited

U.S. PATENT DOCUMENTS

| | | | | |
|---|---|---|---|---|
| 2013/0191791 A1* | 7/2013 | Rydenhag | ............... | G06F 3/017 |
| | | | | 715/863 |
| 2014/0278435 A1* | 9/2014 | Ganong, III | ............ | G10L 15/22 |
| | | | | 704/275 |
| 2014/0334089 A1* | 11/2014 | Schade | ................... | G06F 1/183 |
| | | | | 361/679.32 |
| 2016/0320823 A1* | 11/2016 | Gerber | .................. | G06F 1/3253 |
| 2017/0110125 A1* | 4/2017 | Xu | .......................... | G10L 17/04 |

FOREIGN PATENT DOCUMENTS

| | | |
|---|---|---|
| JP | 2017-209869 A | 11/2017 |
| WO | 2018017284 A1 | 1/2018 |

* cited by examiner

STANDBY MODE IN ELECTRONIC DEVICE, INFORMATION PROCESSING SYSTEM, INFORMATION PROCESSING METHOD, AND PROGRAM

FIELD OF THE INVENTION

The present invention relates to an electronic device, an information processing system, an information processing method, and a program.

BACKGROUND OF THE INVENTION

In recent years, in information processing devices, such as a Laptop PC (Personal Computer), a technique is known which provides a low power consumption state (for example, S0ix state) in which the information processing devices can be returned to an active state by event driven of an OS (Operating System) or an application (for example, see Japanese Unexamined Patent Application Publication No. 2017-209869). For example, Windows 10 (Windows is a registered trademark.) carries Modern Standby utilizing such an S0ix state and enables the execution of predetermined processing in the background while realizing a low power consumption state in which the display or the like is stopped by the modern standby.

SUMMARY OF THE INVENTION

When a standby mode, such as the above-described modern standby, is utilized, processing, such as the reception of e-mails, for example, is sometimes performed, in the background in a state in which an operation is apparently stopped by the stop of the display or a state in which an LCD chassis is closed in a clamshell PC in conventional information processing devices. In the conventional information processing devices, it has been difficult for a user to know state changes by such internal processing, so that the convenience has decreased in some cases.

The present invention has been made in order to solve the above-described problems. It is an object of the present invention to provide an electronic device, an information processing system, an information processing method, and a program capable of increasing the convenience and the visibility of notification in the standby mode.

In order to solve the above-described problems, the first aspect of the present invention is an electronic device attachable to and detachable from an information processing device having a mode control portion performing control for switching an operation state in which background processing is executed in a standby mode in which the display of a display portion is stopped and a low power consumption state in which the information processing device can be quickly returned to the operation state and having a light emission portion disposed so as to be visibly recognized in a state in which the display of the display portion is stopped and a lighting control portion lighting the light emission portion in the standby mode when a predetermined event to be notified (i.e., given) to a user occurs in the background processing.

According to the first aspect of the present invention, the electronic device may be configured so as to have a switch portion disposed so as to be operable in the state in which the display of the display portion is stopped and so that the lighting control portion outputs a start request of returning the information processing device to the operation state from the low power consumption state to the mode control portion in response to an operation of the switch portion and the mode control portion performs control for switching the state to the operation state based on the start request.

According to the first aspect of the present invention, the information processing device may have a voice assistant portion executing voice assistant processing of receiving an operation of the device by a user's voice and, when an operation of pressing down the switch portion for a predetermined period or longer is performed, the mode control portion may switch the state to the operation state and cause the voice assistant portion to start an operation of the voice assistant processing in the electronic device described above.

According to the first aspect of the present invention, the voice assistant portion may receive the operation by the user's voice in a period while the switch portion is pressed down in the electronic device described above.

According to the first aspect of the present invention, the switch portion may have a fingerprint sensor detecting fingerprint information of a user operating the switch portion and the voice assistant portion may receive the operation by the user's voice when the validity of the user operating the switch portion is confirmed based on the fingerprint information of the user detected by the fingerprint sensor in the electronic device described above.

According to the first aspect of the present invention, the mode control portion may switch the state to the operation state based on the start request and cause the information processing device to perform different kinds of processing according to the contents of the operation of the switch portion in the electronic device described above.

The second aspect of the present invention is an electronic device attachable to and detachable from an information processing device having a mode control portion performing control for switching an operation state in which background processing is executed in a standby mode in which the display of a display portion is stopped and a low power consumption state in which the information processing device can be quickly returned to the operation state and having a switch portion disposed so as to be operable in a state in which the display of the display portion is stopped and an operation control portion outputting a start request of returning the information processing device to the operation state from the low power consumption state to the mode control portion in response to an operation of the switch portion.

The third aspect of the present invention is an information processing method including a mode control step of performing control for switching an operation state in which background processing is executed in a standby mode in which the display of a display portion is stopped and a low power consumption state in which an information processing device can be quickly returned to the operation state, a confirmation step of confirming that an electronic device attachable to and detachable from the information processing device and having a light emission portion disposed so as to be visibly recognized in a state in which the display of the display portion is stopped is attached, and a lighting control step of lighting the light emission portion in the standby mode when a predetermined event to be notified (i.e., given) to a user occurs in the background processing.

The aspects of the present invention can increase the convenience in a standby mode.

DETAILED DESCRIPTION OF THE INVENTION

Hereinafter, an information processing device, an electronic device, and an information processing method according to one embodiment of the present invention are described with reference to the drawings.

First Embodiment

Figure 1:
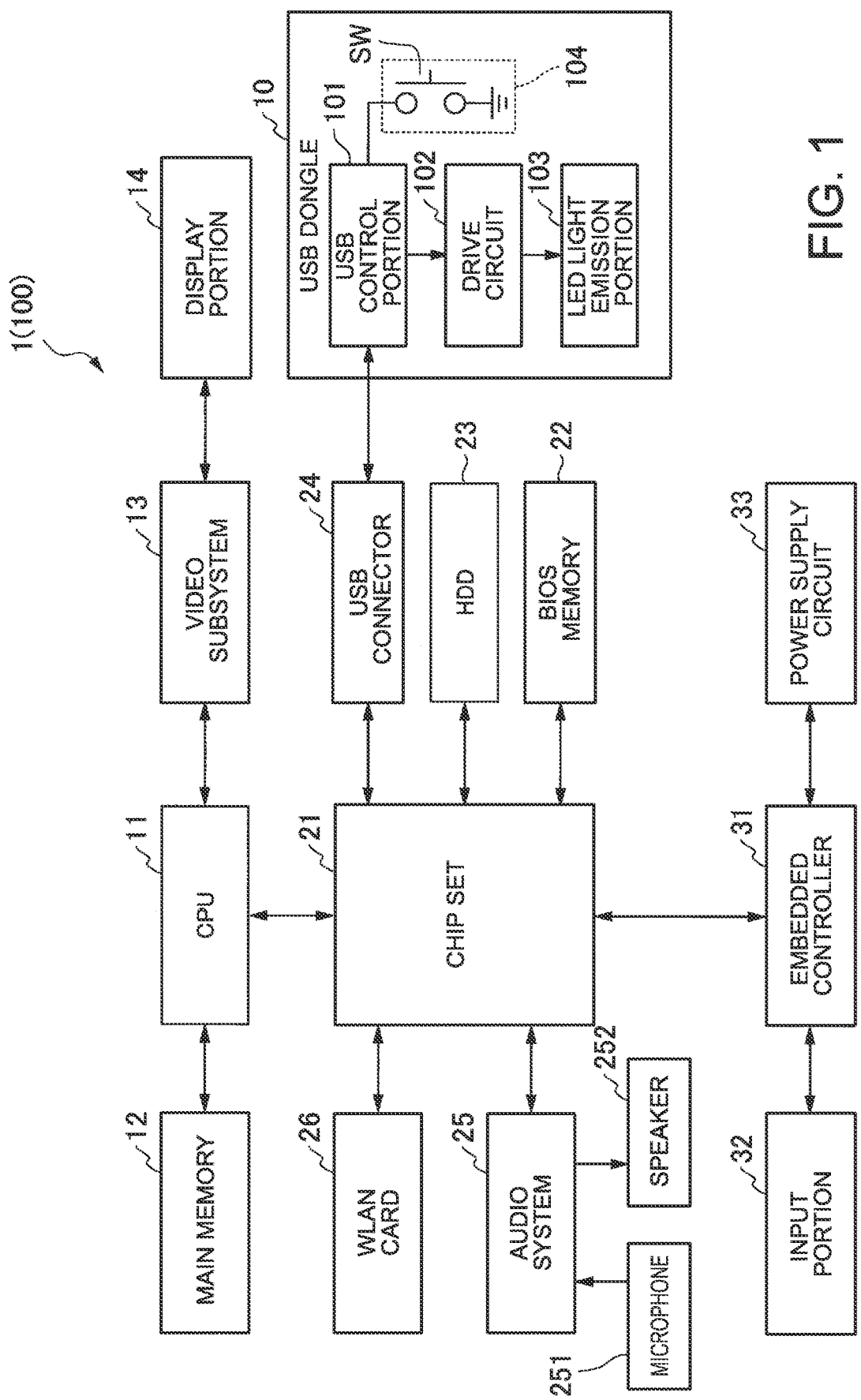
FIG. 1 is a view illustrating an example of the main hardware configuration of a Laptop PC according to a first embodiment.

FIG. 1 is a view illustrating an example of the main hardware configuration of a Laptop PC 1 according to a first embodiment. This embodiment describes the Laptop PC 1 as an example of the information processing device.

As illustrated in FIG. 1, the Laptop PC 1 has a CPU 11, a main memory 12, a video subsystem 13, a display portion 14, a chip set 21, a BIOS memory 22, an HDD 23, a USB connector 24, an audio system 25, a WLAN card 26, an embedded controller 31, an input portion 32, a power supply circuit 33, a USB dongle 10, a microphone 251, and a speaker 252.

The USB dongle 10 is configured so as to be attachable to and detachable from the Laptop PC 1 and an information processing system 100 having the Laptop PC 1 and the USB dongle 10 may be acceptable.

The CPU (Central Processing Unit) 11 executes various kinds of arithmetic processing to control the entire Laptop PC 1 by program control.

The main memory 12 is a writable memory utilized as a read area of execution programs of the CPU 11 or a work area where processing data of the execution programs is written. The main memory 12 contains a plurality of DRAM (Dynamic Random Access Memory) chips, for example.

The execution programs include various drivers, various services/utilities, and application programs for hardware-operating an OS and peripherals, and the like.

The video subsystem 13 is a subsystem for realizing functions relating to image display and contains a video controller. The video controller processes a drawing instruction from the CPU 11, writes processed drawing information in a video memory and reading the drawing information from the video memory, and then outputs the drawing information as drawing data (display data) to the display portion 14.

The display portion 14 is a liquid crystal display, for example, and displays a display screen based on the drawing data (display data) output from the video subsystem 13.

The chip set 21 has controllers, such as a USB (Universal Serial Bus), a serial ATA (AT Attachment), an SPI (Serial Peripheral Interface) bus, a PCI (Peripheral Component Interconnect) bus, a PCI-Express bus, and an LPC (Low Pin Count) bus, and a plurality of devices is connected thereto. In FIG. 1, the BIOS memory 22, the HDD 23, the USB connector 24, the audio system 25, the WLAN card 26, and the embedded controller 31 as an example of the devices are connected to the chip set 21.

The BIOS (Basic Input Output System) memory 22 contains an electrically rewritable nonvolatile memory, such as an EEPROM (Electrically Erasable Programmable Read Only Memory) or a flash ROM, for example. The BIOS memory 22 stores a system firmware for controlling the BIOS, the embedded controller 31, and the like, for example.

The HDD (Hard Disk Drive) 23 (one example of the nonvolatile storage) stores an OS, various drivers, various services/utilities, application programs, and various data. The USB connector 24 is a connector for connecting the peripherals utilizing a USB. In this embodiment, the USB dongle 10 is connected to the USB connector 24.

The audio system 25 performs recording, reproduction, and output of voice data. To the audio system 25, the microphone 251 and the speaker 252 are connected. The audio system 25 is utilized for a voice assistant function described later.

The WLAN (Wireless Local Area Network) card 26 is connected to a network by a wireless (radio) LAN to perform data communication. When receiving data from the network, for example, the WLAN card 26 generates an event trigger indicating that the data has been received.

The embedded controller 31 is a one-chip microcomputer monitoring and controlling various devices (peripherals, sensors, and the like) irrespective of the system state of the Laptop PC 1. The embedded controller 31 has a power supply management function controlling the power supply circuit 33. The embedded controller 31 contains a CPU, a ROM, a RAM, and the like which are not illustrated and has an A/D input terminal, a D/A output terminal, a timer, and a digital input/output terminal of multiple channels. To the embedded controller 31, the input portion 32, the power supply circuit 33, and the like are connected through the input/output terminals. The embedded controller 31 controls operations thereof.

The embedded controller 31 controls the power supply circuit 33 according to the system state (for example, S0 state to S5 state) specified in the ACPI (Advanced Configuration and Power Interface) specification. Herein, the S0 state is the most active state and is a usual operation state (Normal operation state). The S5 state is a shutdown state (Power-off state) in which the power supply is turned off by software. The S4 state is a hibernation state which is a suspension state in which the work contents are saved in the HDD 23 or the like.

The CPU 11 of this embodiment copes with the S0ix state which is a low power consumption state in which the Laptop PC can be quickly returned to the S0 state. The embedded controller 31 executes control of the power supply circuit 33 coping with a standby mode (for example, modern standby mode) utilizing the S0ix state. Herein, the S0ix state is an extended state of the S0 state specified in the ACPI specification and is the S0ix state in which the power consumption is reduced than the power consumption in the S0 state.

In this embodiment, in the modern standby mode, the S0ix state described above and the S0 state in which background processing is executed are switched to be used in a state in which the display of the display portion 14 is turned off (stopped). Herein, the background processing refers to processing performed in the background without involving the display of the display portion 14, for example. Details of the modern standby mode are described later.

The input portion 32 is an input device, such as a keyboard, a pointing device, or a touchpad, for example.

The power supply circuit 33 contains a DC/DC converter, a charge and discharge unit, a battery unit, an AC/DC adapter, and the like, for example, and converts a DC voltage supplied from the AC/DC adapter or the battery unit into a plurality of voltages required for operating the Laptop PC 1. Moreover, the power supply circuit 33 supplies power to each portion of the Laptop PC 1 based on the control from the embedded controller 31.

The USB dongle 10 (one example of the electronic device) is configured so as to be attachable to and detachable from the Laptop PC 1 through the USB connector 24. The USB dongle 10 has a USB control portion 101, a drive circuit 102, an LED (Light Emitting Diode) light emission portion 103, and a switch portion 104.

The LED light emission portion 103 (one example of the light emission portion) is an indicator having a light emitting diode (LED), for example, and is disposed so as to be visibly recognized in a state in which the display of the display portion 14 is stopped. The LED light emission portion 103 has an LED element of three primary colors of red (Red), green (Green), and blue (Blue), for example, and can change the light emission color by changing a current flowing into each LED element.

The drive circuit 102 is an LED drive circuit lighting the LED light emission portion 103. The drive circuit 102 turns on or off the LED light emission portion 103 based on a lighting instruction or a light-off instruction of the LED light emission portion 103 from the USB control portion 101.

The switch portion 104 contains a switch SW, such as a button switch, for example, and is disposed so as to be operable in the state in which the display of the display portion 14 is stopped.

The USB control portion 101 (one example of the lighting control portion) causes the drive circuit 102 to light the LED light emission portion 103 when a predetermined event to be notified to a user occurs in the background processing of the Laptop PC 1. When receiving a notification command indicating that the predetermined event has occurred from the Laptop PC 1 through the USB connector 24, the USB control portion 101 transmits the lighting instruction of the LED light emission portion 103 to the drive circuit 102 to cause the drive circuit 102 to light the LED light emission portion 103. The predetermined event refers to an event, such as a case where an e-mail has been received (incoming), a case where a scheduled date and time registered beforehand has come in a scheduler (calendar), or a case where an SNS (Social Networking Service) has been updated in the background processing of the Laptop PC 1, for example.

The USB control portion 101 outputs a start request of cancelling the low power consumption state (S0ix state) of the Laptop PC 1, and then bringing the Laptop PC 1 into the operation state (S0 state) to the Laptop PC 1 through the USB connector 24 in response to an operation of the switch portion 104. In this case, the USB control portion 101 functions as an operation control portion. The operation of the switch portion 104 is an operation, such as press-down of the switch SW of the switch portion 104, for example. Processing after bringing the Laptop PC 1 into the operation state (S0 state) may be changed according to an operation, such as one time of press-down of the switch SW, two times of press-down of the switch SW, or long press-down of the switch SW. More specifically, the mode control portion 41 may switch the state to the operation state (S0 state) based on the start request and may cause the Laptop PC 1 to execute different kinds of processing (for example, start processing of the voice assistant function, update processing of the SNS, voice input of the voice assistant function, and the like) according to the contents of the operation of the switch portion 104.

In this embodiment, the USB control portion 101 outputs a start request of starting the voice assistant function of the Laptop PC 1 described later in response to the press-down of the switch SW as an example.

Herein, the appearance of the USB dongle 10 according to this embodiment is described with reference to FIG. 2 and FIG. 3.

Figure 2:
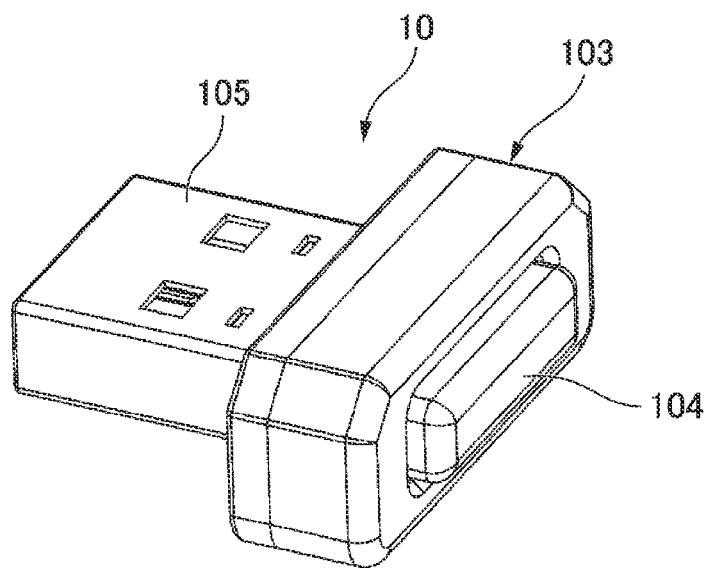
FIG. 2 is an outside view illustrating an example of a USB dongle in the first embodiment.

FIG. 2 is an outside view illustrating an example of the USB dongle 10 in this embodiment. FIG. 3 is a view illustrating an arrangement example of the USB dongle 10 in this embodiment.

As illustrated in FIG. 2, the USB dongle 10 has the LED light emission portion 103 and the switch portion 104 described above and a USB terminal portion 105.

The USB terminal portion 105 is a terminal for the USB and is inserted into the USB connector 24 of the Laptop PC 1 to connect the USB dongle 10 and the Laptop PC 1 by USB as illustrated in FIG. 2.

In FIG. 2, a USB Type-A is exemplified as the USB terminal portion 105 and a Type-B, a Type-C, a Mini-A, a Mini-B, a Micro-A, a Micro-B, Lightning (Registered Trademark), or the like may be acceptable insofar as the same function is provided.

The LED light emission portion 103 and the switch portion 104 are disposed so as to be visibly recognized when disposed (connected) in the Laptop PC 1. At the tip of the USB dongle 10, the switch portion 104 (switch SW) is disposed and is disposed so that a user can press down the switch SW.

Figure 3:
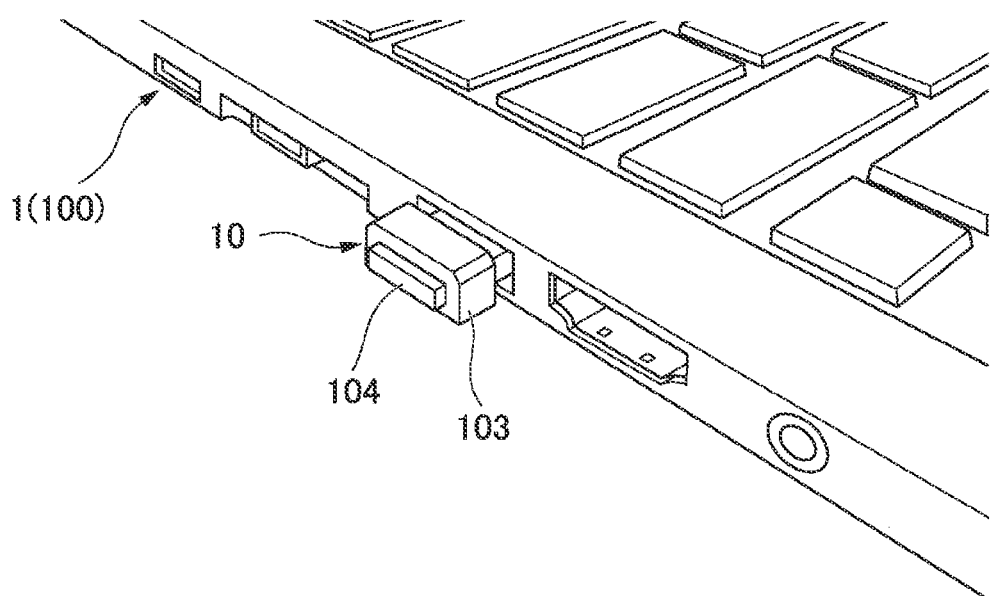
FIG. 3 is a view illustrating an arrangement example of the USB dongle in the first embodiment.

The LED light emission portion 103 of the USB dongle 10 is disposed so as to be visibly recognized even in the state in which the display of the display portion 14 is stopped as illustrated in FIG. 3. The switch portion 104 (switch SW) of the USB dongle 10 is disposed so as to be operable even in the state in which the display of the display portion 14 is stopped.

Next, a system (information processing system 100) of the Laptop PC 1 according to this embodiment is described with reference to FIG. 4.

Figure 4:
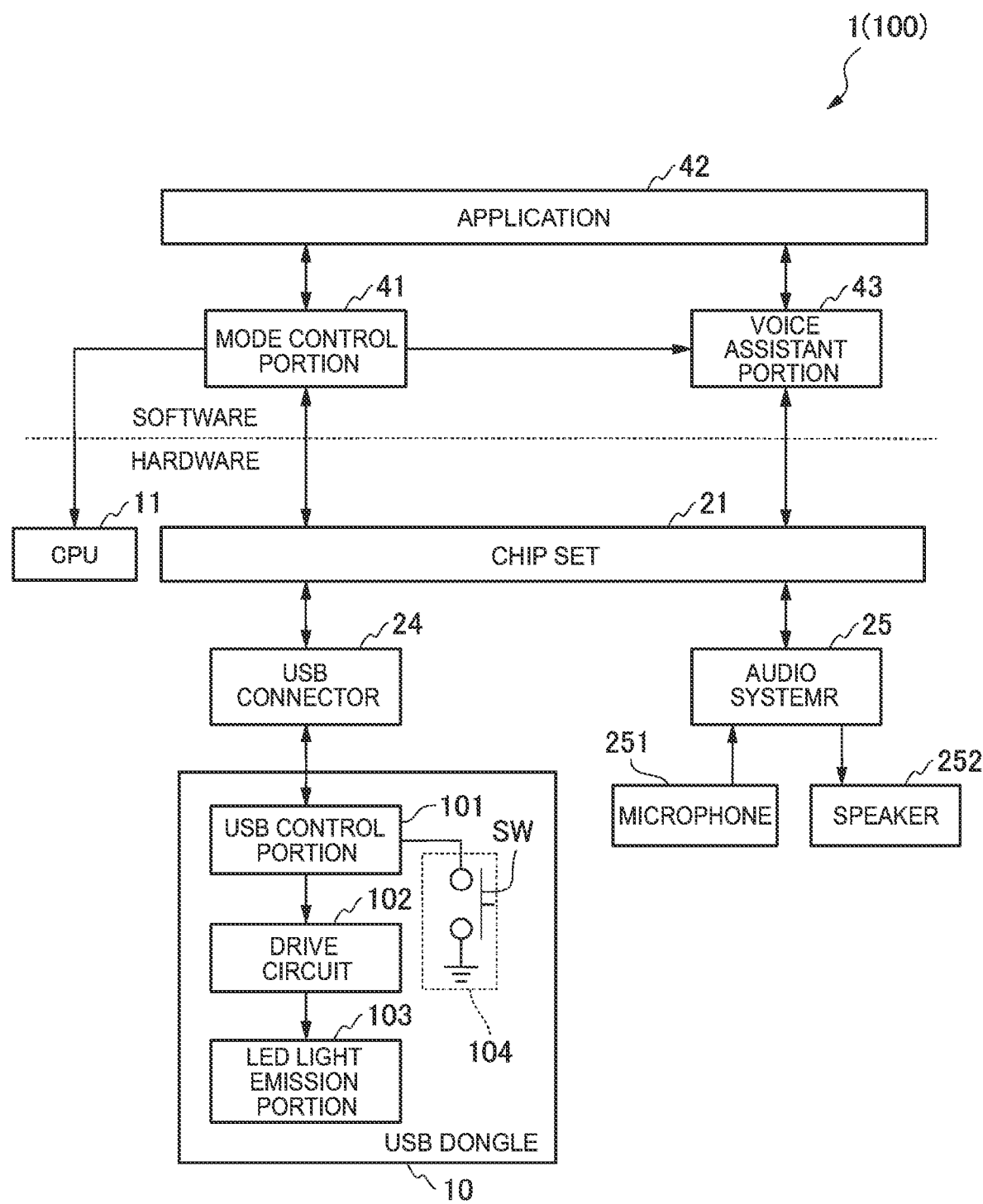
FIG. 4 is a block diagram illustrating an example of the functional configuration of the Laptop PC according to the first embodiment.

FIG. 4 is a block diagram illustrating an example of the functional configuration of the Laptop PC 1 according to this embodiment.

As illustrated in FIG. 4, the system (information processing system 100) of the Laptop PC 1 has a mode control portion 41, a voice assistant portion 43, and an application 42 realized by software. The system of the Laptop PC 1 has the USB dongle 10, the CPU 11, the chip set 21, the USB connector 24, the audio system 25, the microphone 251, and the speaker 252 as the main hardware of this embodiment.

In FIG. 4, software is realized by reading of programs stored in the HDD 23 or the BIOS memory 22 into the main memory 12 and executing the programs by the CPU 11.

The mode control portion 41 controls an operation mode of the system of the Laptop PC 1. The mode control portion 41 stops the display of the display portion 14 in response to a user's action that a user brings the display of the display portion 14 into a state in which the display of the display portion 14 is not seen, for example. Moreover, the mode control portion 41 changes the mode to the modern standby mode of bringing the Laptop PC 1 into the S0ix state (low power consumption state) in response to the stop of the display, for example. The mode control portion 41 changes the CPU 11 and the chip set 21 to the S0ix state from the S0 state.

Herein, the user's action that a user brings the display of the display portion 14 into a state in which the display of the display portion 14 is not seen refers to a standby request, e.g., a display chassis (LCD chassis) carrying the display portion 14 is brought into a closed state by a user, the modern standby mode is selected by press-down of a power button by a user or an operation of the OS, or the like, for example.

Moreover, in the modern standby mode (standby mode) in which the display of the display portion 14 is stopped, the mode control portion 41 performs control for switching the S0 state in which the background processing is executed and the S0ix state in which the processing can be switched to the background processing. The mode control portion 41 changes the state to the S0 state in which the background processing is executed from the S0ix state in response to periodical event triggers, such as a timer, and then causes the Laptop PC 1 to execute the application 42 set beforehand.

Moreover, the mode control portion 41 confirms that the USB dongle 10 is attached to the Laptop PC 1. More specifically, the mode control portion 41 confirms that the USB dongle 10 is attached to the Laptop PC 1 through the chip set 21 and the USB connector 24.

Moreover, when a predetermined event to be notified to a user occurs by the execution of the application 42 in the background processing, the mode control portion 41 outputs the lighting instruction of the LED light emission portion 103 to the USB dongle 10. The mode control portion 41 transmits the lighting instruction of lighting the LED light emission portion 103 to the USB control portion 101 through the chip set 21 and the USB connector 24.

Moreover, the mode control portion 41 changes the state to the S0ix state from the S0 state again when the background processing is completed.

Moreover, the mode control portion 41 performs control for switching the state to the S0 state from the S0ix state based on the start request from the USB dongle 10. For example, when an operation of pressing down the switch portion 104 for a predetermined period or longer is performed, the mode control portion 41 switches the state to the S0 state from the S0ix state and causes the voice assistant portion 43 to start an operation of voice assistant processing.

The application 42 is a processing function portion of application software to be performed in the background processing, for example. The application 42 executes processing of reception of e-mails (incoming of e-mails), reception of the update of the SNS, or the update of an OS or application programs, and the like through the WLAN card 26 or the like, for example. Moreover, when a predetermined event to be notified to a user occurs, such as the reception of e-mails, for example, the application 42 notifies the mode control portion 41 that the predetermined event has occurred as an event trigger.

The voice assistant portion 43 executes the voice assistant processing of receiving an operation of the device by a user's voice. The voice assistant portion 43 receives the operation by the user's voice during a period while the switch portion 104 is pressed down, for example. More specifically, the voice assistant portion 43 acquires operation information of the switch portion 104 of the USB dongle 10 through the mode control portion 41. When the switch SW of the switch portion 104 is pressed down, the voice assistant portion 43 causes the audio system 25 to bring the microphone 251 and the speaker 252 into an ON state, and then receives the operation by the user's voice through the chip set 21.

Next, an operation of the Laptop PC 1 according to this embodiment is described with reference to the drawings.

Figure 5:
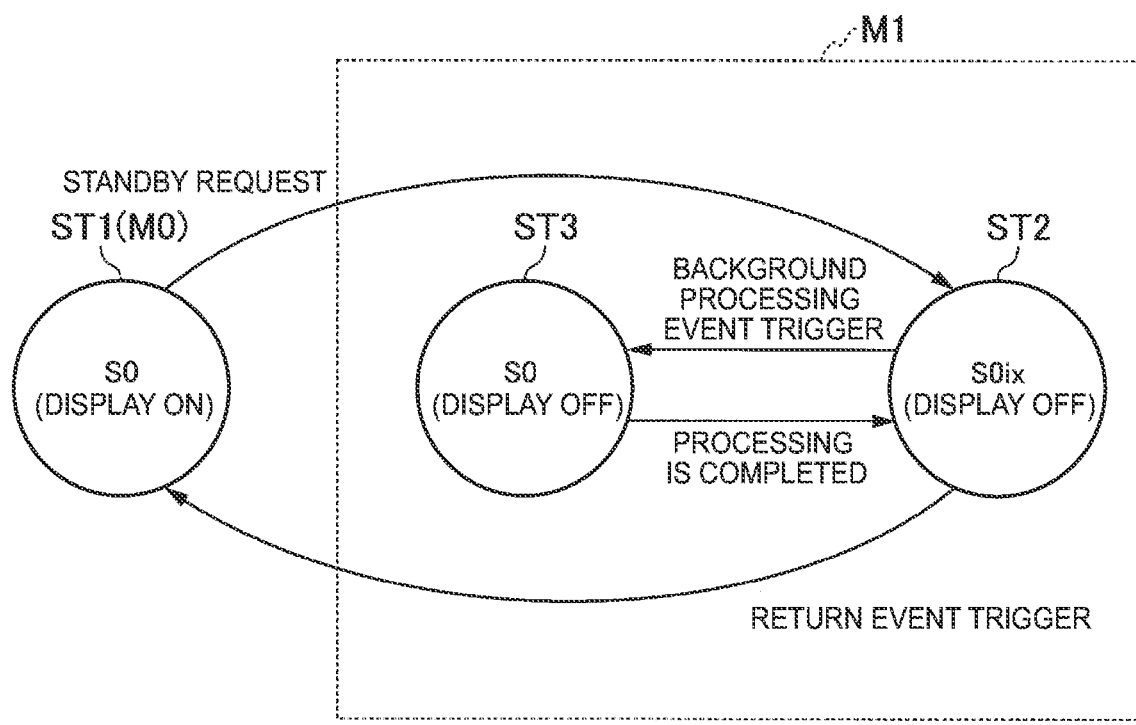
FIG. 5 is a view illustrating an example of the state transition of the Laptop PC according to the first embodiment.

FIG. 5 is a view illustrating an example of the state transition of the Laptop PC 1 according to this embodiment.

In FIG. 5, a state ST1 is a state in which the Laptop PC 1 is in a normal operation mode M0. In the state ST1, the system state is the S0 state (Display ON).

In the state ST1, when there is a standby request that a user brings the display chassis (LCD chassis) into a closed state, for example, the Laptop PC 1 shifts to a modern standby mode M1. By the standby request, the Laptop PC 1 stops the display (Display OFF) of the display portion 14, and then brings the Laptop PC 1 into the S0ix state (State ST2). More specifically, the mode control portion 41 of the Laptop PC 1 causes the video subsystem 13 to stop the display of the display portion 14 in response to the standby request. Moreover, the mode control portion 41 brings the CPU 11 and the chip set 21 into the S0ix state (Display OFF) (State ST2).

In the state ST2, when there is an event trigger of the background processing, the Laptop PC 1 shifts to the S0 state (State ST3). For example, the Laptop PC 1 shifts to the state ST3 periodically by a timer of the embedded controller 31 or by the detection of the reception of the WLAN card 26. Moreover, when the switch portion 104 is pressed down, for example, in the USB dongle 10, for example, the Laptop PC 1 shifts to the S0 state (Display OFF) (State ST3).

In the state ST3, the background processing is executed by the application 42. When a predetermined event to be notified to a user occurs in the background processing in the state ST3, the mode control portion 41 transmits the lighting instruction of lighting the LED light emission portion 103 to the USB control portion 101 through the chip set 21 and the USB connector 24. When the background processing is completed in the state ST3, the Laptop PC 1 returns to the state ST2 (S0ix state (Display OFF)) described above.

When a return event trigger occurs in the state ST2 described above, the Laptop PC 1 makes transition to the state ST1. Herein, the return event trigger is an event trigger by the press-down of the power button or an operation of the input portion 32 by a user, or the like, for example. The mode control portion 41 causes the video subsystem 13 to resume the display of the display portion 14 in response to the event trigger, and then instructs the cancellation of the modern standby mode M1. Then, the Laptop PC 1 returns to the state ST1 (Normal operation mode M0).

Next, the shift processing to the modern standby mode in this embodiment is described with reference to FIG. 6.

Figure 6:
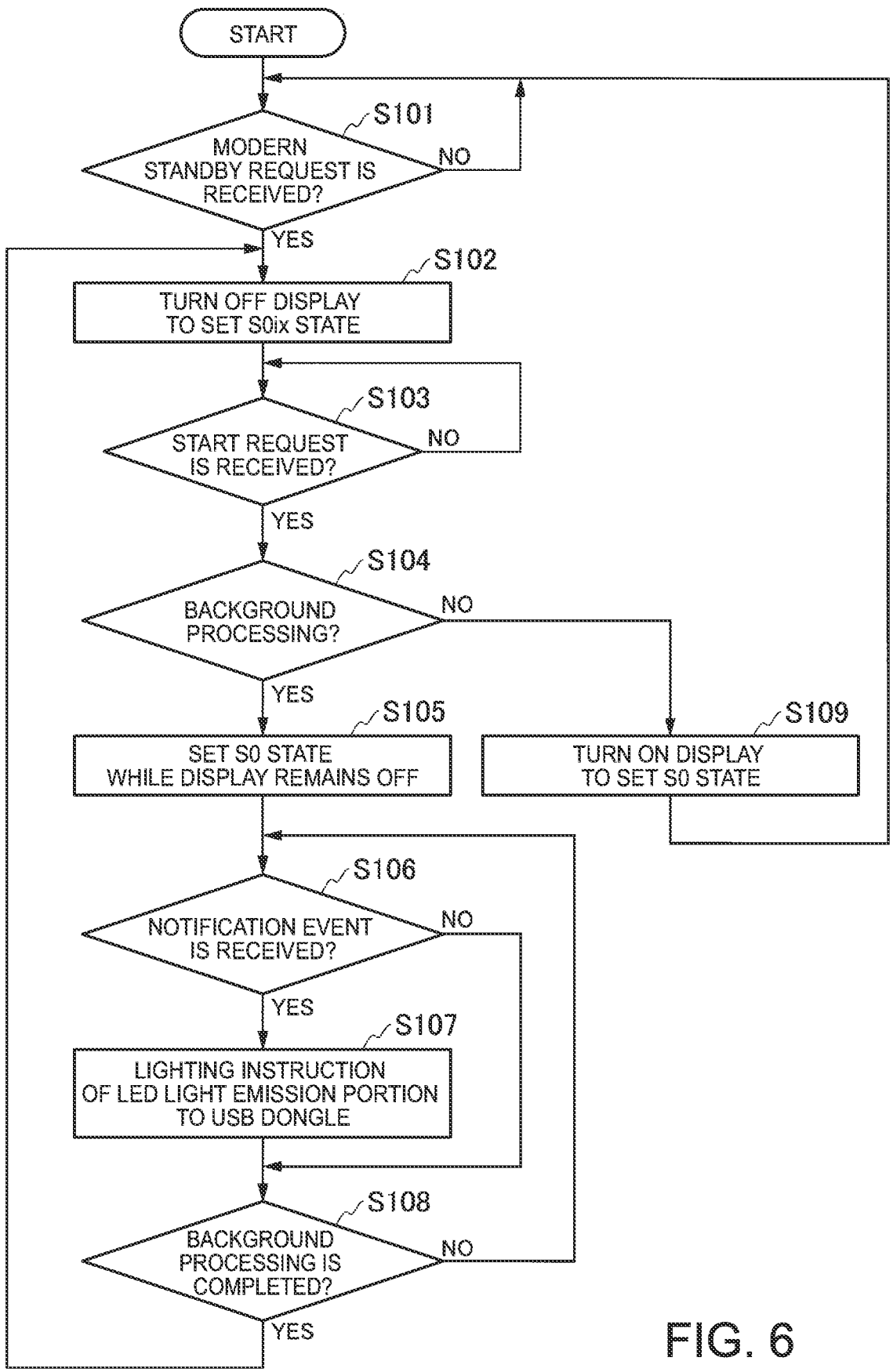
FIG. 6 is a flow chart illustrating an example of shift processing to a modern standby mode of the Laptop PC according to the first embodiment.

FIG. 6 is a flow chart illustrating an example of the shift processing to the modern standby mode in this embodiment.

In FIG. 6, the mode control portion 41 first determines whether there is a standby request that a user brings the display chassis (LCD chassis) into a closed state or the like, for example (Step S101). When there is the standby request (Step S101: YES), the mode control portion 41 proceeds the processing to Step S102. When there is no standby request (Step S101: NO), the mode control portion 41 returns the processing to Step S101.

In Step S102, the mode control portion 41 turns off the display to bring the Laptop PC 1 into the S0ix state. The mode control portion 41 turns off the display of the display portion 14 through the video subsystem 13 and changes the CPU 11 and the chip set 21 to the S0ix state from the S0 state. More specifically, the mode control portion 41 makes transition to the state ST2 of the modern standby mode M1 from the state ST1 (Normal operation mode M0) illustrated in FIG. 5.

Next, the mode control portion 41 determines whether there is a start request (Step S103). The mode control portion 41 determines whether there is a periodical event trigger, such as a timer, a return event trigger by a user, an event trigger of press-down of the switch portion 104 of the USB dongle 10, or the like as the start request, for example. When there is the start request (Step S103: YES), the mode control portion 41 proceeds the processing to Step S104. When there is no start request (Step S103: NO), the mode control portion 41 returns the processing to Step S103.

In Step S104, the mode control portion 41 determines whether the start request requires background processing. The mode control portion 41 determines whether the start request requires background processing according to the factor of the event trigger of the start request. The mode control portion 41 proceeds the processing to Step S105 when the start request requires background processing (Step S104: YES). The mode control portion 41 proceeds the processing to Step S109 when the start request does not require background processing (Step S104: NO). The case where the start request does not require background processing is a case of a return event trigger by a user, such as the press-down of the power button or the operation of the input portion 32 by a user, for example.

In Step S105, the mode control portion 41 brings the Laptop PC 1 into the S0 state in a state in which the display remains off. The mode control portion 41 changes the CPU 11 and the chip set 21 to the S0 state from the S0ix state, and then causes the application 42 set beforehand to execute the background processing. More specifically, the mode control portion 41 makes transition to the state ST3 from the state ST2 illustrated in FIG. 5.

Next, the mode control portion 41 determines whether there is a notification event (Step S106). The mode control portion 41 determines based on an event trigger whether the notification event is to be notified to a user, such as the reception of e-mails, has occurred by the background processing by the application 42, for example. The mode control portion 41 proceeds the processing to Step S107 when there is the notification event (Step S106: YES). The mode control portion 41 proceeds the processing to Step S108 when there is no notification event (Step S106: NO).

In Step S107, the mode control portion 41 outputs a lighting instruction of the LED light emission portion 103 to the USB dongle 10. The mode control portion 41 transmits the lighting instruction of lighting the LED light emission portion 103 to the USB control portion 101 of the USB dongle 10 through the chip set 21 and the USB connector 24 to light the LED light emission portion 103.

In Step S108, the mode control portion 41 determines whether the background processing is completed. When the background processing by the application 42 is completed (Step S108: YES), the mode control portion 41 returns the processing to Step S102, and then changes the state to the S0ix state from the S0 state (Display OFF) again. More specifically, the mode control portion 41 makes transition to the state ST2 from the state ST3 illustrated in FIG. 5. The mode control portion 41 returns the processing to Step S106 when the background processing by the application 42 is not completed (Step S108: NO).

In Step S109, the mode control portion 41 turns on the display to bring the Laptop PC 1 into the S0 state. The display of the display portion 14 is turned on through the video subsystem 13 and the CPU 11 and the chip set 21 are changed to the S0 state from the S0ix state. More specifically, the mode control portion 41 makes transition to the state ST1 (Normal operation mode M0) from the state ST2 of the modern standby mode M1 illustrated in FIG. 5.

The mode control portion 41 maintains the state in which the LED light emission portion 103 is lighted from the processing of Step S108 to the processing of Step S109 through the processing of Step S102 to the processing of the step S104. The mode control portion 41 causes the drive circuit 102 to turn off the LED light emission portion 103 when a user confirms the notification event after the processing of Step S109. More specifically, the mode control portion 41 outputs a light-off instruction of the LED light emission portion 103 to the USB dongle 10.

Next, an operation of the USB dongle 10 according to this embodiment is described with reference to FIG. 7.

Figure 7:
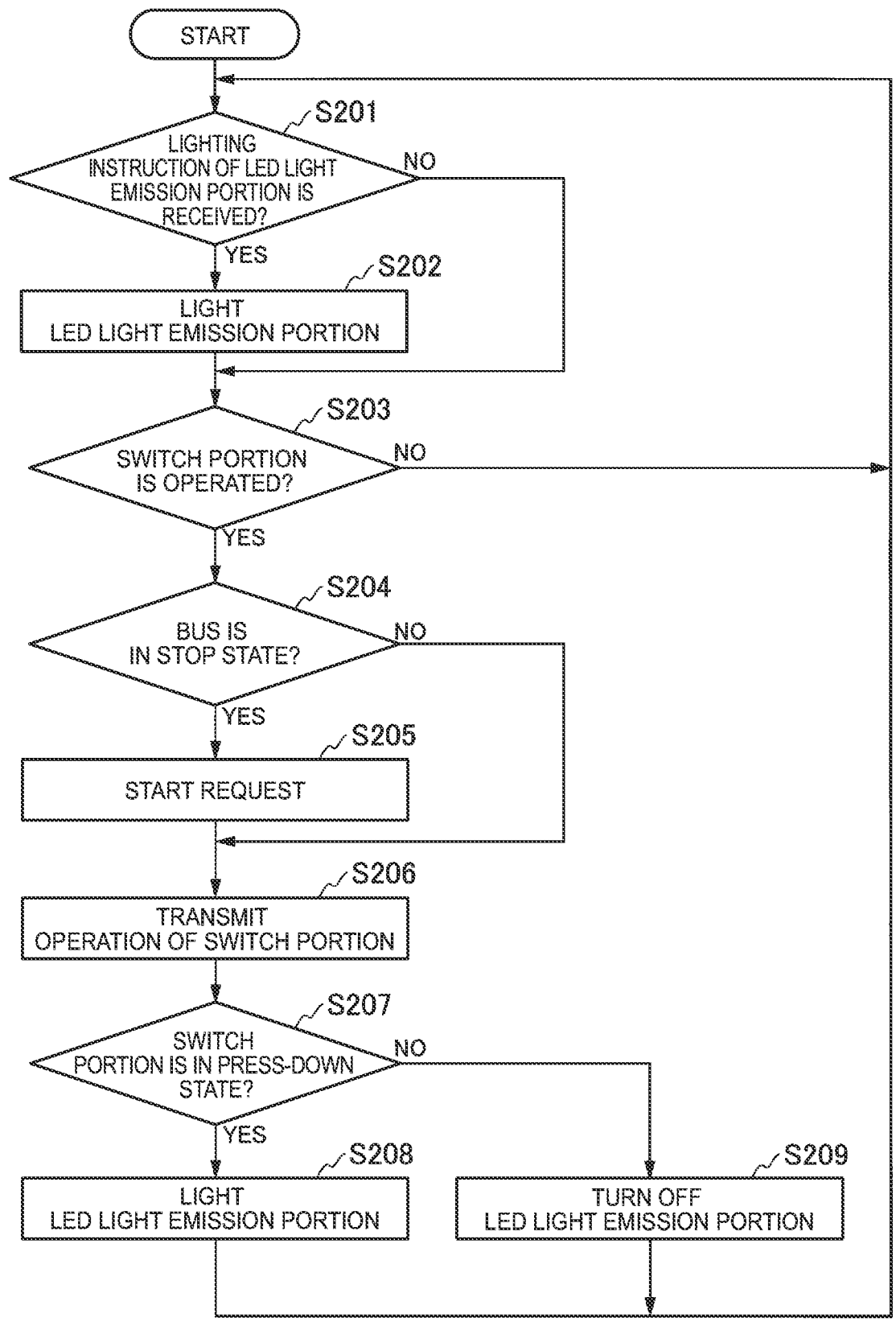
FIG. 7 is a flow chart illustrating an example of an operation of the USB dongle according to the first embodiment.

FIG. 7 is a flow chart illustrating an example of the operation of the USB dongle 10 according to this embodiment.

In FIG. 7, the USB control portion 101 of the USB dongle 10 first determines whether there is the lighting instruction of the LED light emission portion 103 (Step S201). The USB control portion 101 determines whether the lighting instruction is received through the USB connector 24 from the mode control portion 41 of the Laptop PC 1. The USB control portion 101 proceeds the processing to Step S202 when the lighting instruction of the LED light emission portion 103 has been received (Step S201: YES). The USB control portion 101 proceeds the processing to Step S203 when the lighting instruction of the LED light emission portion 103 has not been received (Step S201: NO).

In Step S202, the USB control portion 101 causes the drive circuit 102 to light the LED light emission portion 103. More specifically, the USB control portion 101 outputs the lighting instruction of the LED light emission portion 103 of the drive circuit 102 to light (light emission) the LED light emission portion 103.

In Step S203, the USB control portion 101 determines whether the switch portion 104 is operated (i.e., has been activated). The USB control portion 101 determines whether the switch SW of the switch portion 104 is pressed down, for example. The USB control portion 101 proceeds the processing to Step S204 when the switch portion 104 is operated (Step S203: YES). The USB control portion 101 returns the processing to Step S201 when the switch portion 104 is not operated (Step S203: NO).

In Step S204, the USB control portion 101 determines whether the bus (USB) is in a stop state. The USB control portion 101 proceeds the processing to Step S205 when the bus (USB) is in the stop state due to the S0ix state (Step S204: YES). The USB control portion 101 proceeds the processing to Step S206 when the bus (USB) is not in the stop state due to the S0 state (Step S204: NO).

In Step S205, the USB control portion 101 issues a start request. More specifically, the USB control portion 101 outputs a start event trigger as the start request to the mode control portion 41 of the Laptop PC 1 through the USB connector 24. Thus, the mode control portion 41 changes the CPU 11 and the chip set 21 to the S0 state from the S0ix state to activate the bus.

In Step S206, the USB control portion 101 transmits the operation of the switch portion 104 to the mode control portion 41 of the Laptop PC 1. More specifically, the USB control portion 101 transmits operation information of the switch portion 104 to the mode control portion 41 through the USB connector 24.

Next, the USB control portion 101 determines whether the switch portion 104 is in a press-down state (Step S207). The USB control portion 101 proceeds the processing to Step S208 when the switch portion 104 is in the press-down state (Step S207: YES). The USB control portion 101 proceeds the processing to Step S209 when the switch portion 104 is not in the press-down state (Step S207: NO).

The USB control portion 101 causes the drive circuit 102 to light the LED light emission portion 103 in Step S208. After the processing of Step S208, the USB control portion 101 returns the processing to Step S201.

The USB control portion 101 causes the drive circuit 102 to turn off the LED light emission portion 103 in Step S209. More specifically, the USB control portion 101 outputs the light-off instruction of the LED light emission portion 103 to the drive circuit 102 to cause the drive circuit 102 to turn off the LED light emission portion 103 (stop the light emission). After the processing of Step S209, the USB control portion 101 returns the processing to Step S201.

Next, start processing of the voice assistant function in this embodiment is described with reference to FIG. 8.

Figure 8:
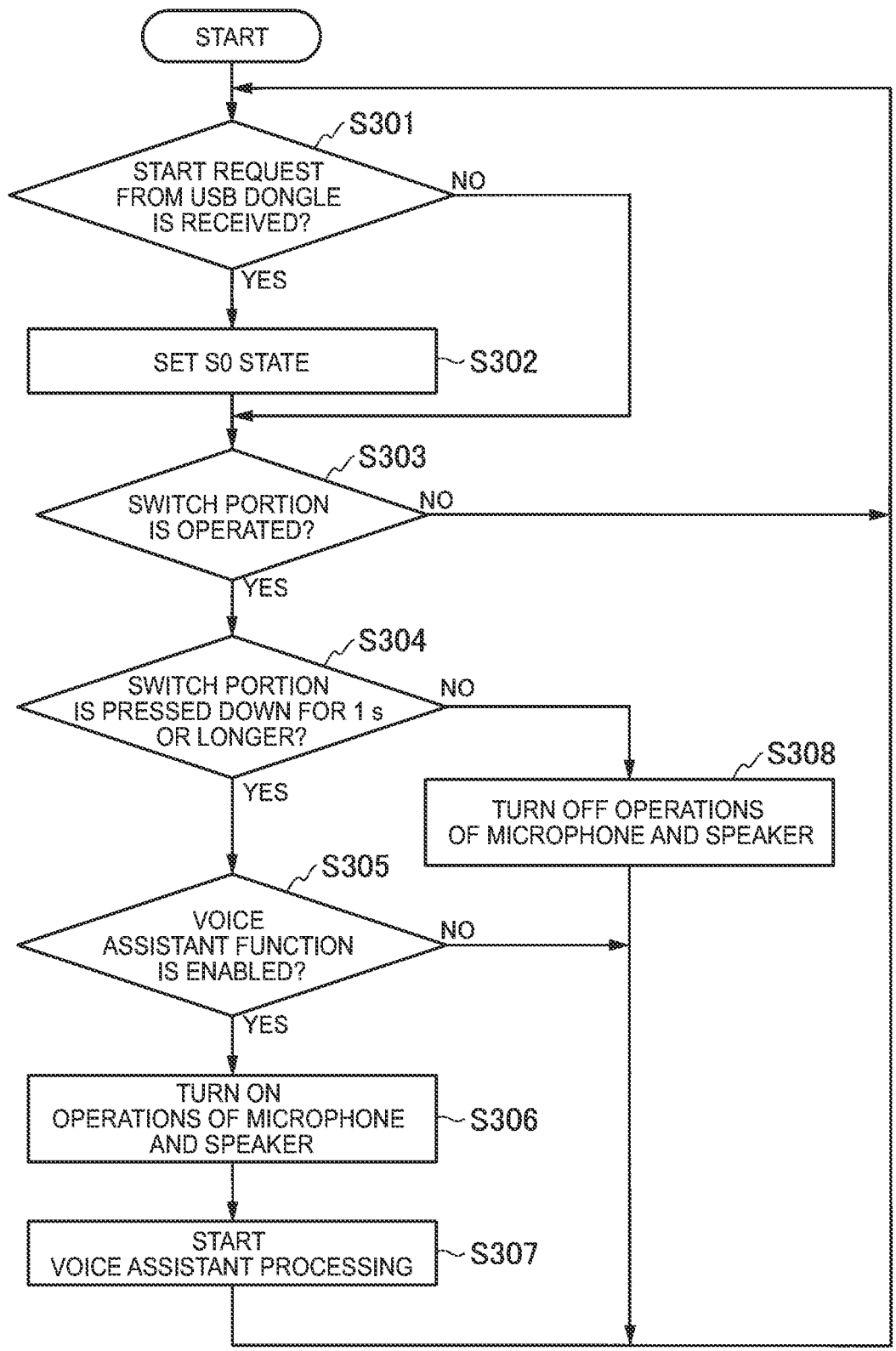
FIG. 8 is a flow chart illustrating an example of start processing of a voice assistant function in the first embodiment.

FIG. 8 is a flow chart illustrating an example of the start processing of the voice assistant function in this embodiment.

As illustrated in FIG. 8, the mode control portion 41 of the Laptop PC 1 first determines whether there is a start request from the USB dongle 10 (Step S301). The mode control portion 41 determines whether the event trigger that the switch portion 104 of the USB dongle 10 is pressed down has occurred as the start request from the USB dongle 10, for example. The mode control portion 41 proceeds the processing to Step S302 when there is the start request from the USB dongle 10 (Step S301: YES). The mode control portion 41 returns the processing to Step S301 when there is no start request from the USB dongle 10 (Step S301: NO).

In Step S302, the mode control portion 41 brings the Laptop PC 1 into the S0 state. More specifically, the mode control portion 41 changes the CPU 11 and the chip set 21 to the S0 state from the S0ix state in a state in which the display remains off.

Next, the mode control portion 41 determines whether the switch portion 104 is operated (Step S303). The mode control portion 41 confirms whether the switch portion 104 of the USB dongle 10 is operated through the USB connector 24. The mode control portion 41 proceeds the processing to Step S304 when the switch portion 104 is operated (Step S303: YES). The mode control portion 41 returns the processing to Step S301 when the switch portion 104 is not operated (Step S303: NO).

In Step S304, the mode control portion 41 determines whether the switch portion 104 is pressed down for 1s (1 second) or longer. The mode control portion 41 acquires operation information of the switch portion 104 through the USB connector 24, for example, and then determines whether the switch portion 104 is pressed down for 1s or longer. The mode control portion 41 proceeds the processing to Step S305 when the switch portion 104 is pressed down for 1s or longer (Step S304: YES). The mode control portion 41 proceeds the processing to Step S308 when the switch portion 104 is not pressed down for 1s or longer (Step S304: NO).

In Step S305, the mode control portion 41 determines whether the voice assistant function is enabled. The mode control portion 41 determines whether the use of the voice assistant function by the press-down of the switch portion 104 is set beforehand. The mode control portion 41 proceeds the processing to Step S306 when the voice assistant function is enabled (Step S305: YES). The mode control portion 41 returns the processing to Step S301 when the voice assistant function is not enabled (Step S305: NO).

In Step S306, the mode control portion 41 turns on operations of the microphone 251 and the speaker 252. The mode control portion 41 causes an audio driver, for example, to enable the microphone 251 and the speaker 252 to which the audio system 25 is connected to turn on the microphone 251 and the speaker 252.

Next, the mode control portion 41 starts voice assistant processing (Step S307). More specifically, the mode control portion 41 causes the voice assistant portion to start processing of the voice assistant function. After the processing of Step S307, the mode control portion 41 returns the processing to Step S301.

In Step S308, the mode control portion 41 turns off the operations of the microphone 251 and the speaker 252. The mode control portion 41 causes the audio driver, for example, to disable the microphone 251 and the speaker 252 to which the audio system 25 is connected to turn off the microphone 251 and the speaker 252. After the processing of Step S308, the mode control portion 41 returns the processing to Step S301.

Next, an operation in which the Laptop PC 1 and the USB dongle 10 in this embodiment cooperate with each other is described.

Figure 9:
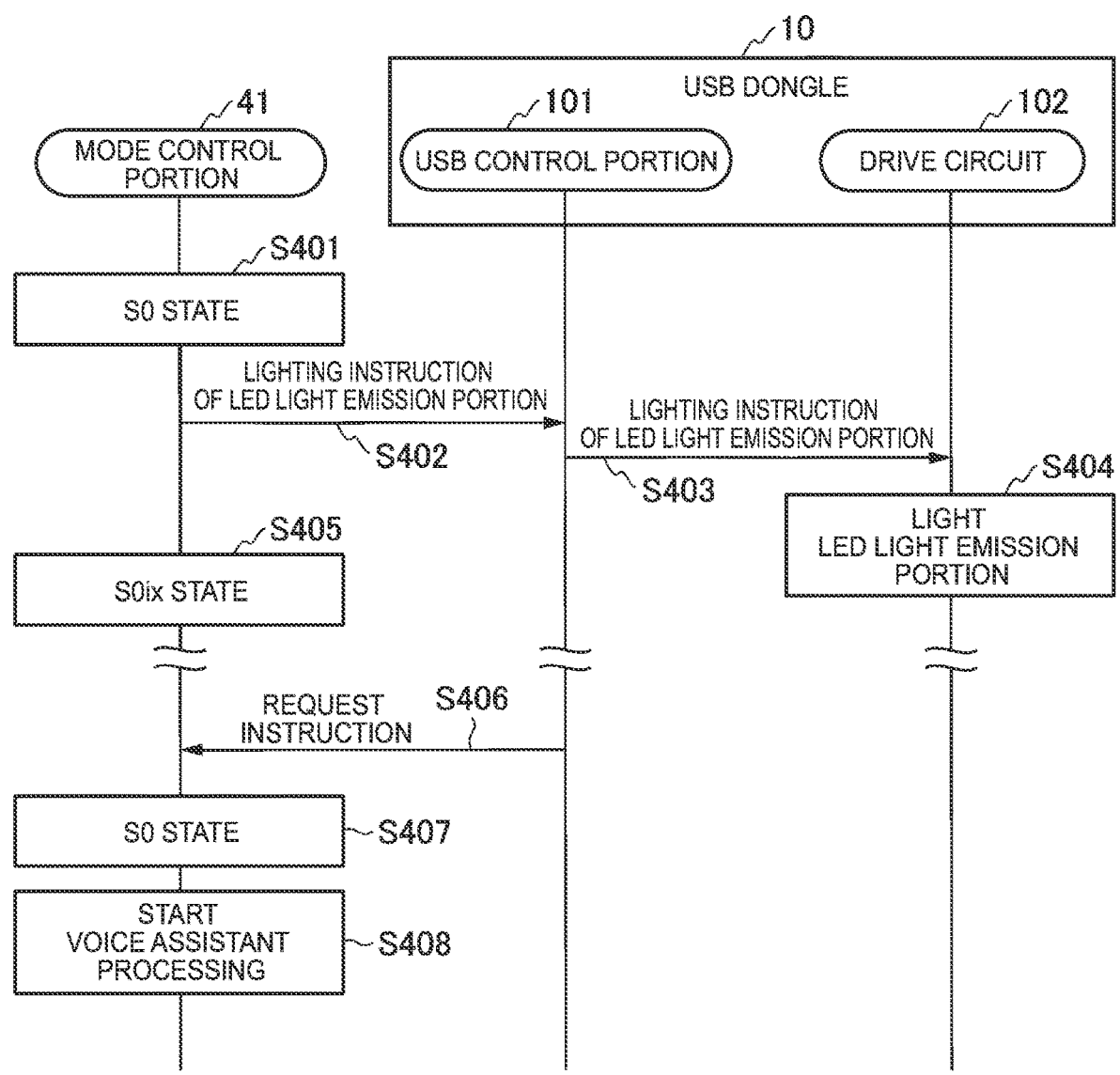
FIG. 9 is a view illustrating an example of operations of the Laptop PC and the USB dongle in the first embodiment.

FIG. 9 is a figure illustrating an example of the operations of the Laptop PC 1 and the USB dongle 10 in this embodiment.

In FIG. 9, the mode control portion 41 of the Laptop PC 1 first brings the Laptop PC 1 into the S0 state (Step S401). The mode control portion 41 causes the application 42 to execute background processing, for example.

Next, when the predetermined event, such as the notification event is to be notified to a user, such as the reception of e-mails, has occurred in the application 42, the mode control portion 41 transmits the lighting instruction of the LED light emission portion 103 to the USB control portion 101 of the USB dongle 10 (Step S402). More specifically, the mode control portion 41 transmits the lighting instruction of the LED light emission portion 103 to the USB control portion 101 through the USB connector 24.

Next, the USB control portion 101 transmits the lighting instruction of the LED light emission portion 103 to the drive circuit 102 (Step S403). The USB control portion 101 transmits the lighting instruction of the LED light emission portion 103 received from the mode control portion 41 to the drive circuit 102.

Next, the drive circuit 102 lights the LED light emission portion 103 (Step S404). The drive circuit 102 generates a drive signal of the LED light emission portion 103 based on the lighting instruction to light the LED light emission portion 103.

Thus, when the predetermined event has occurred by the background processing during the modern standby mode, the Laptop PC 1 and the USB dongle 10 according to this embodiment notify a user that the predetermined event has occurred by lighting the LED light emission portion 103 of the USB dongle 10.

The mode control portion 41 brings the Laptop PC 1 into the S0ix state when the background processing is completed (Step S405). The mode control portion 41 changes the CPU 11 and the chip set 21 to the S0ix state from the S0 state.

When the press-down of the switch portion 104 (for example, press-down of the switch SW for 1s or longer) is detected, for example, the USB control portion 101 of the USB dongle 10 transmits a start request of cancelling the S0ix state, and then bringing the Laptop PC 1 to the S0 state to the mode control portion 41 of the Laptop PC 1 (Step S406). The USB control portion 101 transmits a start request of returning the Laptop PC 1 to the S0 state from the S0ix state to the mode control portion 41 through the USB connector 24.

Next, the mode control portion 41 brings the Laptop PC 1 into the S0 state (Step S407), and then starts the voice assistant processing (Step S408). The mode control portion 41 turns on the operations of the microphone 251 and the speaker 252 and causes the voice assistant portion 43 to start the processing of the voice assistant function.

Thus, the Laptop PC 1 according to this embodiment cancels the S0ix state, and then starts the voice assistant function by the operation (press-down for 1s or longer) of the switch portion 104 of the USB dongle 10 by a user.

As described above, the Laptop PC 1 (information processing device) according to this embodiment has the mode control portion 41, the LED light emission portion 103 (light emission portion), and the USB control portion 101 (lighting control portion). The mode control portion 41 controls an operation mode to perform control for switching the operation state (S0 state) in which the background processing is executed in the standby mode (for example, modern standby mode) in which the display of the display portion 14 is stopped and the low power consumption state (S0ix state) in which the Laptop PC 1 can be quickly returned to the operation state (S0 state). The LED light emission portion 103 is disposed so as to be visibly recognized in the state in which the display of the display portion 14 is stopped. The USB control portion 101 causes the drive circuit 102 to light the LED light emission portion 103 in the standby mode when the predetermined event to be notified to a user has occurred in the background processing.

Thus, the Laptop PC 1 according to this embodiment enables a user to know that the predetermined event has occurred by the background processing (changes in the internal state) and can increase the convenience and the visibility of the notification in the standby mode (Modern standby mode).

The USB dongle 10 (electronic device) according to this embodiment is an electronic device attachable to and detachable from the Laptop PC 1 having the mode control portion 41 performing control for switching the operation state in which the background processing is executed in the standby mode in which the display of the display portion 14 is stopped and the low power consumption state in which the Laptop PC 1 can be quickly returned to the operation state (S0 state) and has the LED light emission portion 103 and the USB control portion 101 (lighting control portion). The LED light emission portion 103 is disposed so as to be visibly recognized in the state in which the display of the display portion 14 is stopped. The USB control portion 101 causes the drive circuit 102 to light the LED light emission portion 103 in the standby mode when the predetermined event to be notified to a user has occurred in the background processing.

Thus, the USB dongle 10 according to this embodiment enables a user to know that the predetermined event has occurred (changes in the internal states of the Laptop PC 1) by the background processing of the Laptop PC and can increase the convenience in the standby mode (Modern standby mode).

The USB dongle 10 according to this embodiment has the switch portion 104 disposed so as to be operable in the state in which the display of the display portion 14 is stopped. The USB control portion 101 outputs the start request of returning the Laptop PC 1 to the operation state (S0 state) from the low power consumption state (S0ix state) to the mode control portion 41 in response to an operation of the switch portion 104. The mode control portion 41 performs control for switching the Laptop PC 1 to the operation state (S0 state) based on the start request.

Thus, the Laptop PC 1 and the USB dongle 10 according to this embodiment can cancel the low power consumption state (S0ix state) by the operation of the switch portion 104 which can be operated in the state in which the display of the display portion 14 is stopped, and therefore can further increase the convenience.

Moreover, the Laptop PC 1 according to this embodiment has the voice assistant portion 43 executing the voice assistant processing of receiving an operation of the device (Laptop PC 1) by a user's voice. When an operation that the switch portion 104 is pressed down for a predetermined period or longer (for example, 1s or longer) is performed, the mode control portion 41 switches the Laptop PC 1 to the operation state (S0 state) and causes the voice assistant portion 43 to start the voice assistant processing.

Thus, the Laptop PC 1 and the USB dongle 10 according to this embodiment can quickly cancel the low power consumption state (S0ix state) by the operation of the switch portion 104, and then cause the voice assistant portion 43 to perform the voice assistant processing, and therefore can further increase the convenience.

Moreover, in this embodiment, the voice assistant portion 43 receives an operation by a user's voice in a period while the switch portion 104 is pressed down.

Thus, the Laptop PC 1 and the USB dongle 10 according to this embodiment receive the operation by the user's voice while the switch portion 104 is pressed down, and therefore can reduce incorrect detection of the operation by a user's voice.

Moreover, the USB dongle 10 (electronic device) having the LED light emission portion 103, the USB control portion 101, and the switch portion 104 is configured so as to be attachable/detachable in this embodiment.

Thus, the Laptop PC 1 according to this embodiment can easily increase the convenience by attaching the USB dongle 10 to the Laptop PC 1 while reducing a load and a cost for changing the configuration and the system of the Laptop PC 1. Moreover, the Laptop PC 1 according to this embodiment can prevent the addition of unnecessary functions to the Laptop PC 1 for a user not requiring the use of the USB dongle 10 because the USB dongle 10 is attachable/detachable.

Moreover, in this embodiment, the mode control portion 41 may be configured so as to switch the state to the operation state based on the start request and cause the Laptop PC 1 to execute different kinds of processing according to the contents of the operation (e.g., one time of press-down of the switch SW, two times of press-down of the switch SW, long press-down of the switch SW, or the like) of the switch portion 104. Herein, the different kinds of processing are the start processing of the voice assistant function, the update processing of the SNS, the voice input of the voice assistant function, and the like, for example.

Thus, the Laptop PC 1 and the USB dongle 10 according to this embodiment can start two or more of the different kinds of processing according to the contents of the operation of the switch portion 104, and therefore can further increase the convenience.

Moreover, the USB dongle 10 according to this embodiment is an electronic device attachable to and detachable from the Laptop PC 1 having the mode control portion 41 performing control for switching the operation state in which the background processing is executed in the standby mode in which the display of the display portion 14 is stopped and the low power consumption state in which the Laptop PC 1 can be quickly returned to the operation state and has the switch portion 104 and the USB control portion 101 (operation control portion). The switch portion 104 is disposed so as to be operable in the state in which the display of the display portion 14 is stopped. The USB control portion 101 outputs the start request of returning the Laptop PC 1 to the operation state (S0 state) from the low power consumption state (S0ix state) to the mode control portion 41 in response to the operation of the switch portion 104.

Thus, the USB dongle 10 according to this embodiment can cancel the low power consumption state (S0ix state) of the Laptop PC 1 by the operation of the switch portion 104 which can be operated in the state in which the display of the display portion 14 is stopped, and therefore can increase the convenience.

The information processing system 100 according to this embodiment has the Laptop PC 1 and the USB dongle 10 described above.

Thus, the information processing system 100 according to this embodiment can exhibit the same effects as the effects of the Laptop PC 1 and the USB dongle 10 described above and can increase the convenience in the standby mode (Modern standby mode).

The information processing method according to this embodiment includes the mode control step, the confirmation step, and the lighting control step. In the mode control step, the mode control portion 41 controlling the operation mode performs control for switching the operation state (S0 state) in which the background processing is executed in the standby mode in which the display of the display portion 14 is stopped and the low power consumption state (S0ix state) in which the processing can be switched to the background processing. In the confirmation step, the mode control portion 41 confirms that the USB dongle 10, attachable to and detachable from the Laptop PC 1 and having the LED light emission portion 103 disposed so as to be visibly recognized in the state in which the display of the display portion 14 is stopped, is attached. In the lighting control step, when the predetermined event to be notified to a user has occurred in the background processing, the USB control portion 101 causes the drive circuit 102 to light the LED light emission portion 103 in the standby mode.

Thus, the information processing method according to this embodiment can exhibit the same effects as the effects of the Laptop PC 1 and the USB dongle 10 described above and can increase the convenience in the standby mode (Modern standby mode).

Second Embodiment

Next, a Laptop PC 1a and a USB dongle 10a (information processing system 100a) according to a second embodiment are described with reference to the drawings. This embodiment describes a modification in which the USB dongle 10a has a fingerprint sensor 106.

Figure 10:
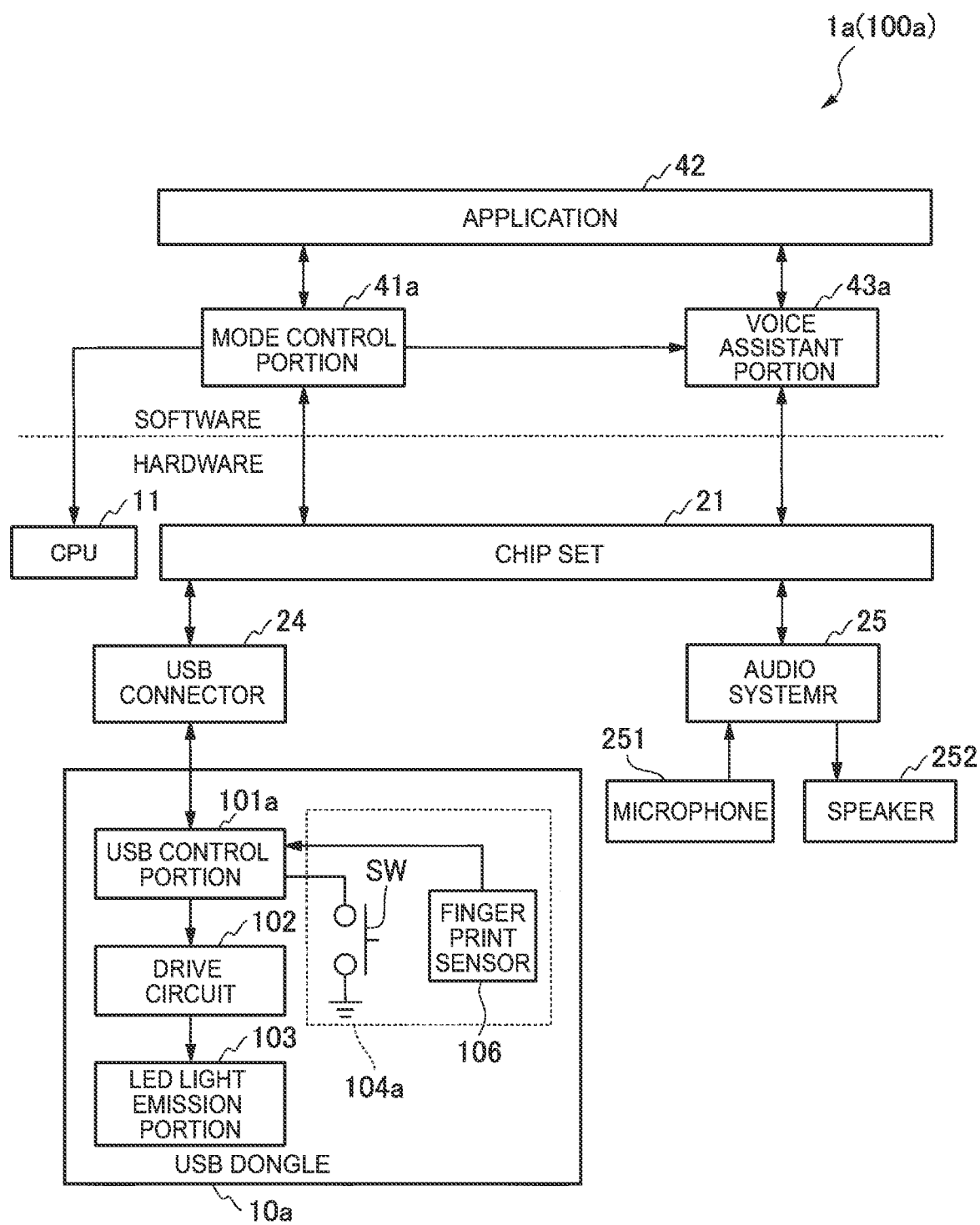
FIG. 10 is a block diagram illustrating an example of the functional configuration of a Laptop PC according to a second embodiment.

FIG. 10 is a block diagram illustrating an example of the functional configuration of the Laptop PC 1a according to the second embodiment.

As illustrated in FIG. 10, a system (information processing system 100a) of the Laptop PC 1a has a mode control portion 41a, a voice assistant portion 43a, and an application portion 42 realized by software. The system of the Laptop PC 1a has the USB dongle 10a, the CPU 11, the chip set 21, the USB connector 24, the audio system 25, the microphone 251, and the speaker 252 as main hardware of this embodiment.

In FIG. 10, the software is realized by reading of programs stored in the HDD 23 or the BIOS memory 22 into the main memory 12, and then executing the programs by the CPU 11.

In FIG. 10, the same configurations as those of the first embodiment illustrated in FIG. 4 described above are designated by the same reference numerals and a description thereof is omitted herein. The hardware configuration of the Laptop PC 1a according to this embodiment is the same as that of the first embodiment illustrated in FIG. 1, and therefore a description thereof is omitted herein.

The USB dongle 10a (one example of the electronic device) is configured so as to be attachable to and detachable from the Laptop PC 1a through the USB connector 24. The USB dongle 10a has a USB control portion 101a, the drive circuit 102, the LED light emission portion 103, and a switch portion 104a. The switch portion 104a has the switch SW and the fingerprint sensor 106.

The fingerprint sensor 106 is disposed in a press down button of the switch SW to detect fingerprint information of a user operating the switch SW, for example. The fingerprint sensor 106 is disposed so as to be able to detect the fingerprint information of the user operating the switch SW by the press-down of the switch SW as illustrated in FIG. 11.

Figure 11:
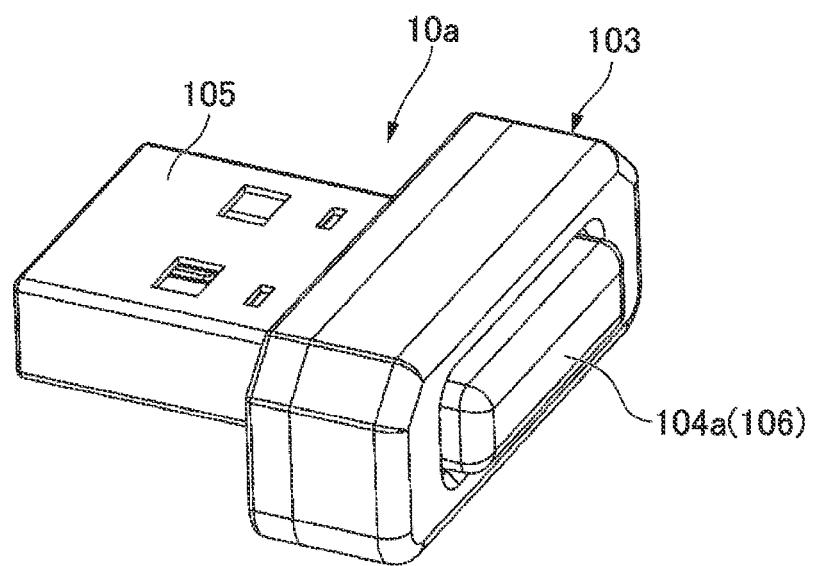
FIG. 11 is an outside view illustrating an example of a USB dongle in the second embodiment.

FIG. 11 is an outside view illustrating an example of the USB dongle 10a in this embodiment.

As illustrated in FIG. 11, the USB dongle 10a has the LED light emission portion 103, the switch portion 104a, the USB terminal portion 105, and the fingerprint sensor 106, and the fingerprint sensor 106 is integrally configured with the switch portion 104a.

The basic function of the USB control portion 101a is the same as that of the USB control portion 101 in the first embodiment described above. The USB control portion 101a transmits the fingerprint information detected by the fingerprint sensor 106 together with operation information of the switch portion 104a to the mode control portion 41a through the USB connector 24.

In this embodiment, the mode control portion 41a acquires the operation information of the switch portion 104a and the fingerprint information from the USB control portion 101a, and then causes the voice assistant portion 43a to start an operation of voice assistant processing when the validity of the user is confirmed based on the acquired fingerprint information and when the switch SW of the switch portion 104a is pressed down for 1 s or longer, for example.

The voice assistant portion 43a receives an operation by a user's voice when the validity of the user operating the switch portion 104a is confirmed based on the fingerprint information of the user detected by the fingerprint sensor 106. Specifically, the voice assistant portion 43a receives the operation by the user's voice based on a start instruction from the mode control portion 41a, for example, when the validity of the user is confirmed based on the fingerprint information detected by the fingerprint sensor 106 and when the switch SW of the switch portion 104a is pressed down for 1s or longer, for example.

Next, start processing of the voice assistant function in this embodiment is described with reference to FIG. 12.

Figure 12:
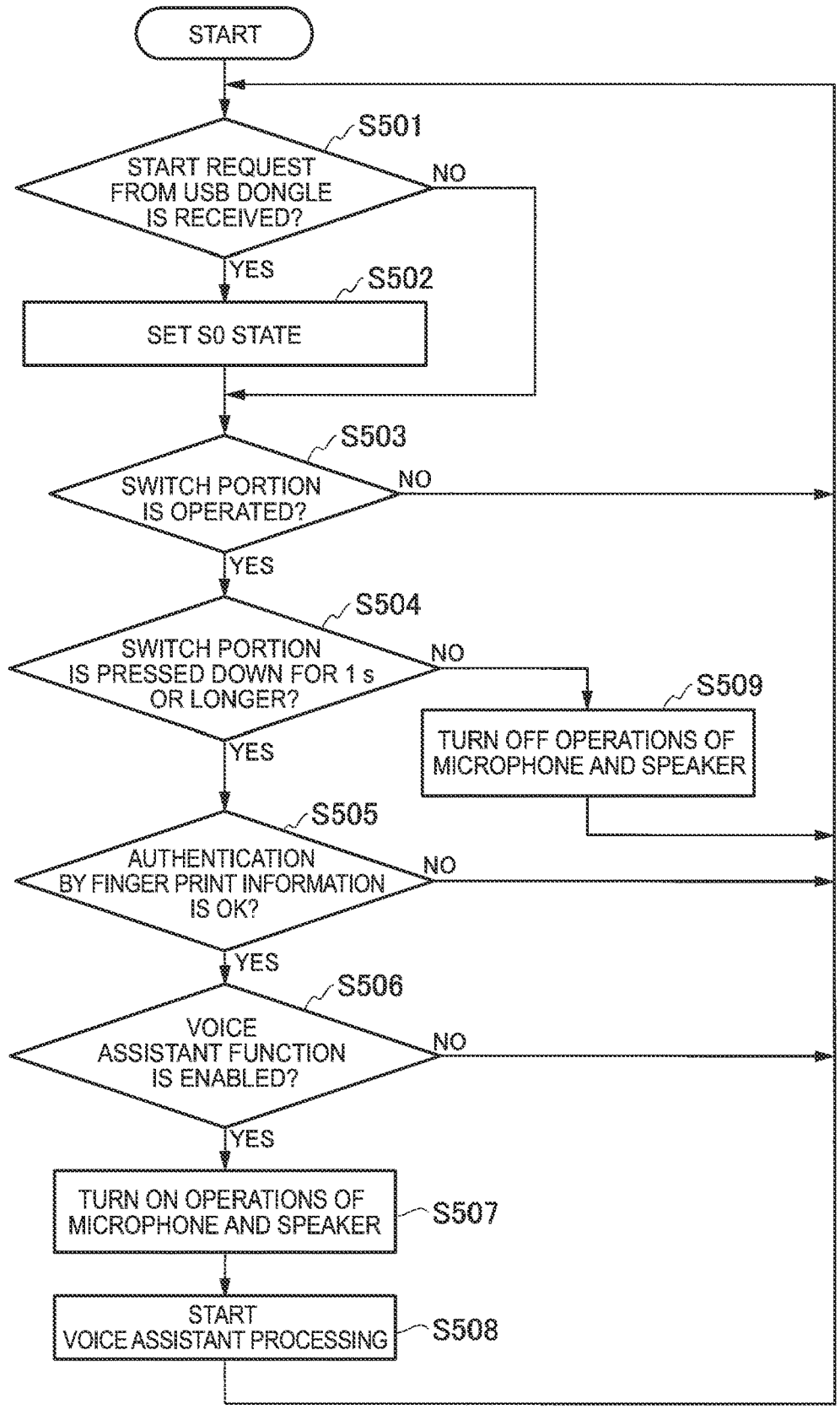
FIG. 12 is a flow chart illustrating an example of start processing of a voice assistant function in the second embodiment.

FIG. 12 is a flow chart illustrating an example of the start processing of the voice assistant function in this embodiment.

In FIG. 12, the processing from Step S501 to Step S504 is the same as the processing from Step S301 to Step S304 illustrated in FIG. 8 described above, and therefore a description thereof is omitted herein.

In Step S504, the mode control portion 41a proceeds the processing to Step S505 when the switch portion 104a is pressed down for 1 s or longer (Step S504: YES). The mode control portion 41a proceeds the processing to Step S509 when the switch portion 104a is not pressed down for 1 s or longer (Step S504: NO).

In Step S505, the mode control portion 41a determines whether authentication by the fingerprint information is O.K. The mode control portion 41a determines the validity of the user by a comparison between the fingerprint information acquired from the USB control portion 101a through the USB connector 24 and fingerprint information of the user registered beforehand. The mode control portion 41a proceeds the processing to Step S506 when the authentication by the fingerprint information is O.K. (The user is valid.) (Step S505: YES). The mode control portion 41a returns the processing to Step S501 when the authentication by the fingerprint information is N.G. (The user is invalid.) (Step S505: NO).

The subsequent processing from Step S506 to Step S509 is the same as the processing from Step S305 to Step S308 illustrated in FIG. 8 described above, and therefore a description thereof is omitted herein.

As described above, the switch portion 104a has the fingerprint sensor 106 detecting the fingerprint information of the user operating the switch portion 104a in this embodiment. The voice assistant portion 43a receives the operation by the user's voice when the validity of the user operating the switch portion 104a is confirmed based on the fingerprint information of the user detected by the fingerprint sensor 106.

Thus, the Laptop PC 1a (or information processing system 100a) according to this embodiment receives an operation by a user's voice when the validity of the user is confirmed by the fingerprint information, and therefore can reduce incorrect detection (for example, incorrect detection of the operation by the user's voice) of the switch portion 104a. For example, a situation in which, when the Laptop PC 1a is stored in a bag or the like in the standby mode (Modern standby mode), the switch portion 104a is accidentally pressed down, so that the voice assistant function is accidentally started can be reduced.

The description of this embodiment described above gives the example in which the mode control portion 41a confirms the validity of a user based on the fingerprint information of the user. However, the voice assistant portion 43a in place of the mode control portion 41a may confirm the validity of a user based on the fingerprint information of the user.

Moreover, the embodiment described above gives the example in which the USB dongle 10a has the switch portion 104a containing the switch SW integrally configured with the fingerprint sensor 106. However, the fingerprint sensor 106 may be provided separately from the switch portion 104a (switch SW) as illustrated in FIG. 13.

Figure 13:
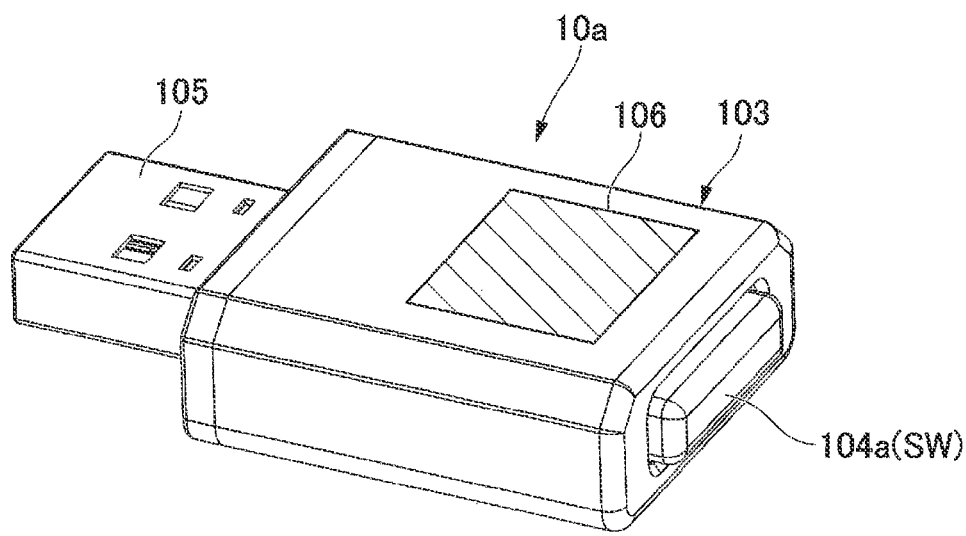
FIG. 13 is an outside view illustrating a modification of the USB dongle in the second embodiment.

FIG. 13 is an outside view illustrating a modification of the USB dongle 10a in this embodiment. As illustrated in FIG. 13, the USB dongle 10a is configured so as to have the fingerprint sensor 106 on a side surface portion and so as to be able to detect the fingerprint information by the fingerprint sensor 106 by the press-down of the switch portion 104a (switch SW).

The present invention is not limited to the embodiments described above and can be altered without deviating from the gist of the present invention.

For example, the embodiments described above describe the example in which the USB dongle 10 (10a) is configured so as to be attachable to and detachable from the Laptop PC 1 (1a) but the present invention is not limited thereto and the USB dongle 10 (10a) may be included in the Laptop PC 1 (1a) to be integrally configured therewith.

The embodiments described above describe the example in which the USB dongle 10 (10a) and the Laptop PC (1a) communicate with each other using the USB but the other interfaces may be used. The USB dongle 10 (10a) may use an I2C (I-squared-C) bus, an SPI (Serial Peripheral Interface), a UART (Universal Asynchronous Receiver Transmitter) communication, a CC Communication, or the like, for example, in place of the USB.

The embodiments described above describe the example in which the information processing device is the Laptop PC 1 (1a) but the present invention is not limited thereto. The information processing device may be another device, such as a tablet terminal device or a desktop PC, for example.

The embodiments described above describe the USB dongle 10 (10a) as an example of the electronic device but the present invention is not limited thereto. An aspect different from that of the USB dongle 10 (10a) may be acceptable.

Figure 14:
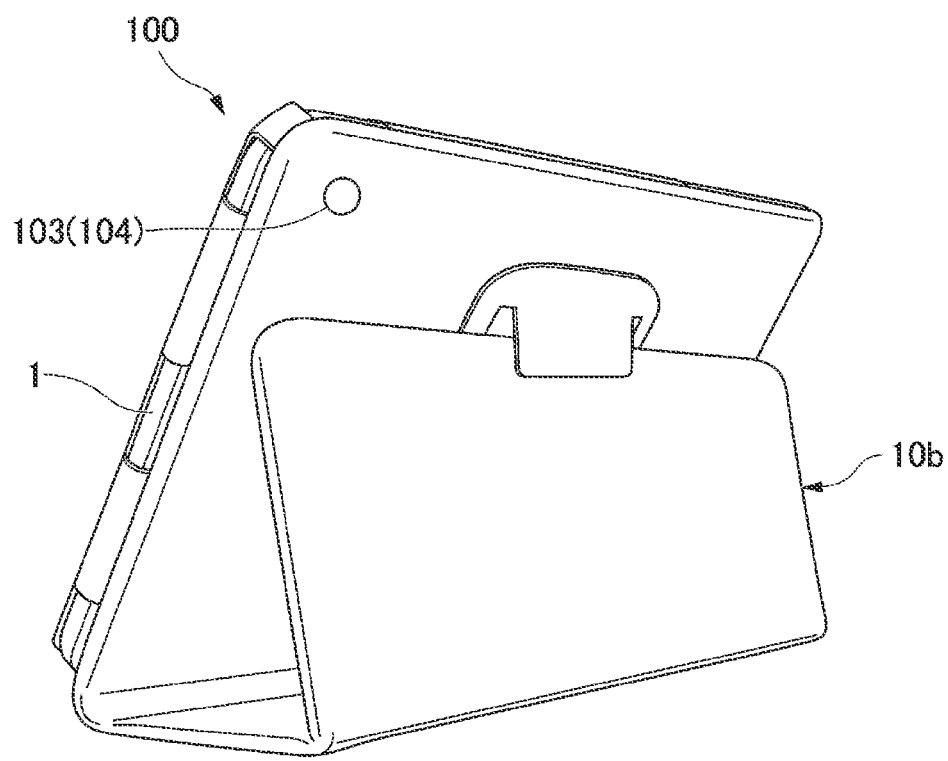
FIG. 14 is an outside view illustrating a modification of an electronic device.

For example, FIG. 14 is an outside view illustrating a modification of the electronic device. In this figure, an electronic device 10b is a cover of the Laptop PC 1. More specifically, such an electronic device 10b may be used in place of the USB dongle 10 (10a).

The embodiments described above describe the example in which the present invention is applied to the modern standby of Windows 10 (Windows is a registered trademark.) as an example of the standby mode but the present invention is not limited thereto and may be applied to standby modes of the other OSs. For the standby mode, connected standby of Windows 8 (Windows is a registered trademark.) and the like may be applied, for example.

The embodiments described above describe the example in which the voice assistant function is started as the background processing in response to the press-down of the switch portion 104 (104a) but the present invention is not limited thereto. The Laptop PC 1 (1a) may be configured so that, when the LED light emission portion 103 is lighted by the incoming of e-mails, e-mail software is started, for example, in response to the press-down of the switch portion 104 (104a), so that the mails, the incoming of which is notified, are displayed.

The embodiments described above describe the example in which the present invention is applied to the reception of e-mails as an example of the predetermined event to be notified to a user but the present invention is not limited thereto and the other predetermined events may be acceptable. In the embodiments described above, the incoming of e-mails (reception of e-mails) to be notified to a user may be the incoming of e-mails (for example, business mails and the like) from a specific party specified beforehand. More specifically, the incoming of e-mails may not be the incoming of all the e-mails and may be the incoming of e-mails filtered under specific conditions. Thus, a user can know the incoming of the e-mails filtered under the specific conditions by lighting of the LED light emission portion 103.

The embodiments described above describe the example in which the voice assistant portion 43 (43*a*) uses the press-down of the switch portion 104 (104*a*) as the starting conditions for the voice assistant function in the background processing but the present invention is not limited thereto. For example, the voice assistant portion 43 may similarly use the press-down of the switch portion 104 (104*a*) as the starting conditions for the voice assistant function in the normal operation mode of the Laptop PC 1 (1*a*). For example, the voice assistant portion 43 (43*a*) may receive an operation by a voice, only when the switch portion 104 (104*a*) is press down.

The embodiments described above describe the example in which the USB control portion 101 (101*a*) and the mode control portion 41 (41*a*) return the Laptop PC 1 to the operation state (S0 state) from the S0ix state which is an example of the low power consumption state by the press-down of the switch portion 104 (104*a*) but the present invention is not limited thereto. For example, the USB control portion 101 (101*a*) and the mode control portion 41 (41*a*) may be configured so as to return the Laptop PC 1 to the operation state (S0 state) from the other low power consumption states, such as an S3 state (sleep state), in place of the S0ix state. More specifically, the Laptop PC 1 (1*a*) is started from the S3 state (sleep state) to start the voice assistant function of the voice assistant portion 43 (43*a*) by the press-down of the switch portion 104 (104*a*).

The USB dongle 10 (10*a*) may be configured so as to change the lighting color (light emission color) of the LED light emission portion 103 by the synthesis of three primary colors of red (Red), green (Green), and blue (Blue) according to the contents of the predetermined event notified from the Laptop PC 1 (1*a*). The USB dongle 10 (10*a*) may be configured so as to change lighting patterns, such as blink, when lighting the LED light emission portion 103.

Each configuration provided in the Laptop PC 1 (1*a*) and the USB dongle 10 (10*a*) described above has a computer system inside. The processing in each configuration provided in the Laptop PC 1 (1*a*) and the USB dongle 10 (10*a*) described above may be performed by recording programs for realizing the function of each configuration provided in the Laptop PC 1 (1*a*) and the USB dongle 10 (10*a*) described above in a recording medium readable by a computer, reading the programs recorded in the recording medium into a computer system, and then executing the programs. Herein, the "reading the programs recorded in the recording medium into a computer system, and then executing the programs" includes installing the programs in a computer system. The "computer system" as used herein includes hardware, such as an OS or peripherals.

The "computer system" may also contain a plurality of computer devices connected through a network containing a communication line, such as the Internet, a WAN, a LAN, or a dedicated line. The "recording medium readable by a computer" refers to portable media, such as a flexible disk, a magneto-optical disc, a ROM, and a CD-ROM, and storage devices, such as a hard disk, built in the computer system. Thus, the recording medium storing the program may be a non-transitory recording medium, such as a CD-ROM.

The recording medium includes a recording medium provided inside or outside accessible from a distribution server for distributing the programs. The program may be divided into a plurality of parts, the divided programs may be individually downloaded at different timing, and then the divided programs are united by each configuration provided in the Laptop PC 1 (1*a*) and the USB dongle 10 (10*a*) or distribution servers individually distributing the divided programs may be different from each other. The "recording medium readable by a computer" includes one holding the program for a definite period of time, such as a volatile memory (RAM), inside the computer system serving as a server or a client when the program is transmitted through the network. The program may be one for realizing some of the functions described above. The program may be one capable of realizing the functions described above in combination with programs already recorded in the computer system, i.e., a so-called a differential file (differential program).

Some or all of the functions may be realized as an integrated circuit, such as an LSI (Large Scale Integration). The functions described above may be individually formed into a processor or some or all of the functions may be integrated to be formed into a processor. A circuit integration technology may be realized not only by the LSI but by a dedicated communication circuit or a general-purpose processor. When a circuit integration technology substituting for the LSI appears due to the progress of the semiconductor technology, an integrated circuit obtained by the technology may be used.

The invention claimed is:

1. An electronic device which is a USB (Universal Serial Bus) dongle detachably connected to a USB connector mounted on an information processing device which is a laptop PC, the information processing device having a mode control portion for switching from an operation state, wherein background processing is executed in a standby mode at least when a display chassis, having a display portion, is closed in a closed state whereby the display portion is not seen by a user, to a low power consumption state wherein the information processing device can be quickly returned to the operation state, the electronic device comprising:
    a light emission portion disposed to be visibly seen when the display chassis is in the closed state; and
    a lighting control portion lighting the light emission portion in the standby mode when a predetermined event, which is to be given to a user, occurs in the background processing.

2. The electronic device according to claim 1, further comprising:
    a switch portion disposed to be operable when the display chassis is in the closed state, wherein:
    the lighting control portion outputs a start request when the display chassis is in the closed state, of returning the information processing device to the operation state from the low power consumption state, to the mode control portion in response to an operation of the switch portion, and the mode control portion performs control for switching a state to the operation state based on the start request.

3. The electronic device according to claim 2, wherein:
the information processing device has a voice assistant portion that executes voice assistant processing of an operation of the device by a user's voice, and
when the switch portion is pressed down for a predetermined period or longer, the mode control portion switches the state to the operation state and causes the voice assistant portion to start the voice assistant processing.

4. The electronic device according to claim 3, wherein:
the voice assistant portion receives the operation by the user's voice while the switch portion is pressed down.

5. The electronic device according to claim 3, wherein:
the switch portion has a fingerprint sensor for detecting fingerprint information of a user operating the switch portion, and
the voice assistant portion receives the operation by the user's voice when validity of the user operating the switch portion is confirmed based on the fingerprint information of the user detected by the fingerprint sensor.

6. The electronic device according to claim 2, wherein:
the mode control portion switches the state to the operation state based on the start request and causes the information processing device to perform different kinds of processing according to content of the operation of the switch portion.

7. An electronic device which is a USB (Universal Serial Bus) dongle detachably connected to a USB connector mounted on an information processing device which is a laptop PC, the information processing device having a mode control portion performing control for switching from an operation state, wherein background processing is executed in a standby mode at least when a display chassis, having a display portion, is closed in a closed state whereby the display portion is not seen by a user, to a low power consumption state wherein the information processing device can be quickly returned to the operation state, the electronic device comprising:
a switch portion disposed to be operable when the display chassis is in the closed state; and
an operation control portion that outputs a start request when the display chassis is in the closed state, of returning the information processing device to the operation state from the low power consumption state, to the mode control portion in response to an operation of the switch portion.

8. The electronic device according to claim 7, wherein:
the information processing device has a voice assistant portion that executes voice assistant processing of an operation of the device by a user's voice, and
when the switch portion is pressed down for a predetermined period or longer, the mode control portion switches a state to the operation state and causes the voice assistant portion to start an operation of the voice assistant processing.

9. The electronic device according to claim 8, wherein:
the voice assistant portion receives the operation by the user's voice while the switch portion is pressed down.

10. The electronic device according to claim 8, wherein:
the switch portion has a fingerprint sensor for detecting fingerprint information of a user operating the switch portion, and
the voice assistant portion receives the operation by the user's voice when validity of the user operating the switch portion is confirmed based on the fingerprint information of the user detected by the fingerprint sensor.

11. The electronic device according to claim 8, wherein:
the mode control portion switches the state to the operation state based on the start request and causes the information processing device to perform different kinds of processing according to content of the operation of the switch portion.

* * * * *